United States Patent
Kim et al.

[11] Patent Number: 5,959,682
[45] Date of Patent: Sep. 28, 1999

[54] DATA SEGMENT SYNC DETECTION CIRCUIT AND METHOD THEREOF

[75] Inventors: Ki-bum Kim, Seoul; Hyun-soo Shin, Suwon, both of Rep. of Korea

[73] Assignee: Samsung Electronics Co., Ltd., Kyungki, Rep. of Korea

[21] Appl. No.: 08/684,183

[22] Filed: Jul. 19, 1996

[30] Foreign Application Priority Data

Aug. 30, 1995 [KR] Rep. of Korea ............. 95-27720

[51] Int. Cl.$^6$ ........................................... H04N 7/52
[52] U.S. Cl. .................. 348/511; 348/194; 348/495; 348/500; 348/521; 358/410; 331/20
[58] Field of Search ..................... 348/194, 434, 348/464, 476, 495, 516, 521, 525, 540, 547, 682, 500, 511–512; 358/410; 327/136; 331/20; 340/14, 870

[56] References Cited

U.S. PATENT DOCUMENTS

| | | | |
|---|---|---|---|
| 4,675,722 | 6/1987 | Hackett | 348/500 |
| 5,416,524 | 5/1995 | Citta et al. | 348/471 |
| 5,420,640 | 5/1995 | Munich et al. | 348/525 |
| 5,444,743 | 8/1995 | Scarpa | 375/368 |
| 5,486,869 | 1/1996 | Cooper | 348/525 |

OTHER PUBLICATIONS

Proceedings of the IEEE, vol. 83, No. 2, Feb. 1, 1995, pp. 158–173, XP000501239, Challapali K et al: "The Grand Alliance System For US HDTV", pp. 170–172.

*Primary Examiner*—Vu Le
*Attorney, Agent, or Firm*—Sughrue, Mion, Zinn, Macpeak & Seas, PLLC

[57] ABSTRACT

A circuit for detecting a data segment sync signal of data segment consisting of a plurality of symbols in a high-definition television, includes a correlator for detecting a correlation value from a received data segment signal, a segment integrator for accumulating the detected correlation value by segments and attenuating the accumulated correlation value in response to an overflow prevention signal, a maximum-value detector for detecting a maximum accumulated correlation value in the segment from the segment integrator output, an overflow prevention circuit for generating the overflow prevention signal by comparing the detected maximum accumulated correlation value with a predetermined reference value, a sync position detector for detecting a symbol position having the detected maximum accumulated correlation value, and a synchronization signal generator for generating a synchronization signal at the symbol position corresponding to the detected maximum accumulated correlation value. The circuit precisely detects data segment sync, by generating the maximum value among the accumulated correlation values in each data segment, even when the position of a data segment sync pulse changes due to errors in the received signal.

34 Claims, 5 Drawing Sheets

DATA SEGMENT SYNC DETECTION CIRCUIT AND METHOD THEREOF

BACKGROUND OF THE INVENTION

The present invention relates to a data segment synchronization ("sync") detection circuit and a method thereof, and more particularly, to a circuit for detecting a data segment synchronization signal by using a correlation characteristic of transferred sync pulses which are respectively inserted at the beginning of data segment lines, and a method thereof.

For years, efforts have been made to develop a large screen, high resolution television. As a result of these efforts, high definition television (HDTV) broadcasts, based on multiple sub-Nyquist sampling encoding (MUSE) in an analog transmission mode, are available in Japan.

In the United States, the Grand Alliance (GA) committee has proposed technical standards for a HDTV system. The GA committee has adopted the vestigial side band (VSB) modulation as a GA-HDTV modulation standard. Specifically, the adopted modulation standards include an 8-VSB using eight levels and a 16-VSB using mode and a high speed cable mode, respectively, as modulation standards in the GA-HDTV.

Meanwhile, to insure proper synchronization between television transmitter and receiver, a sync signal (pulse) is inserted into the signal transmitted from a television station, at the beginning of each horizontal line. The receiver detects these sync pulses in the received broadcast signal, and processes the required signal. It should be noted that each of the 8-VSB and 16-VSB modes require a specific transmission data format for each horizontal line, which is called a data segment.

FIG. 1 shows the structure of one data segment for 8-VSB modulation of a GA-HDTV transmission. The data segment is constituted of 832 symbols comprised of 828 symbols of data and a 4-symbol sync pulse. The data segment sync pulse is inserted into an 8-level ("−7" through "+7") digital data stream, at the starting portion of each data segment. The sync pulse includes a predetermined pattern of four symbols having the sequential levels of +5, −5, −5 and +5, and the data (i.e., information signal) is formed of randomized signal levels.

In the receiver which receives the GA-HDTV signals, a data segment sync pulse is detected in the initial 4-symbol period of each data segment. Signals are then processed according to the detected data segment sync pulse. However, when a carrier frequency offset or symbol frequency offset is present in an input signal, the number of symbols in one data segment can be altered, and the position of the sync pulse can change accordingly. When this occurs, the sync detection circuit cannot properly detect the synchronization signal.

SUMMARY OF THE INVENTION

To solve the above problem, it is an object of the present invention to provide a data segment sync detection circuit which enables precise detection of data segment sync pulse under inferior channel conditions.

Another object of the present invention is to provide a data segment sync detection circuit having a simplified circuit structure by utilizing only the most significant bit of received data, when the data segment synchronization signal is detected by utilizing an accumulated correlation value of sync pulses.

It is still another object of the present invention to provide a method of detecting the data segment synchronization signal precisely even under inferior channel conditions.

Accordingly, to achieve the above-described objects, there is provided a circuit for detecting a data segment sync signal consisting of a plurality of symbols. The circuit comprises: correlation-value-detecting means for detecting a correlation value from the data segment being received by a unit of a predetermined-number of symbols; accumulating means for accumulating the detected correlation value by a unit of a segment, and for dividing the accumulated correlation value by a predetermined value; maximum-value-detecting means for detecting a maximum accumulated correlation value in the segment from an output of the segment-accumulating means; overflow preventing means for generating an overflow prevention signal by comparing the detected maximum accumulated correlation value with a threshold value; sync-position-detecting means for detecting a position having the detected maximum accumulated correlation value; and sync generating means for generating a synchronization signal at the position corresponding to the detected maximum accumulated correlation value.

In addition, there is provided a method for detecting the data segment sync of a data segment consisting of a plurality of symbols. The method comprises the steps of: (a) detecting a correlation value from a data segment signal being received by a unit of a predetermined-number of symbols; (b) accumulating the detected correlation value by a unit of a segment; (c) dividing the accumulated correlation value by a predetermined value; (d) detecting a maximum accumulated correlation value in the segment from the accumulated correlative value in step b; (e) generating the overflow prevention signal by comparing the detected maximum accumulated correlation value with a threshold value; (f) detecting a symbol position having the detected maximum accumulated correlation value; and (g) generating a synchronization signal at the symbol position corresponding to the detected maximum accumulated correlation value.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 2:
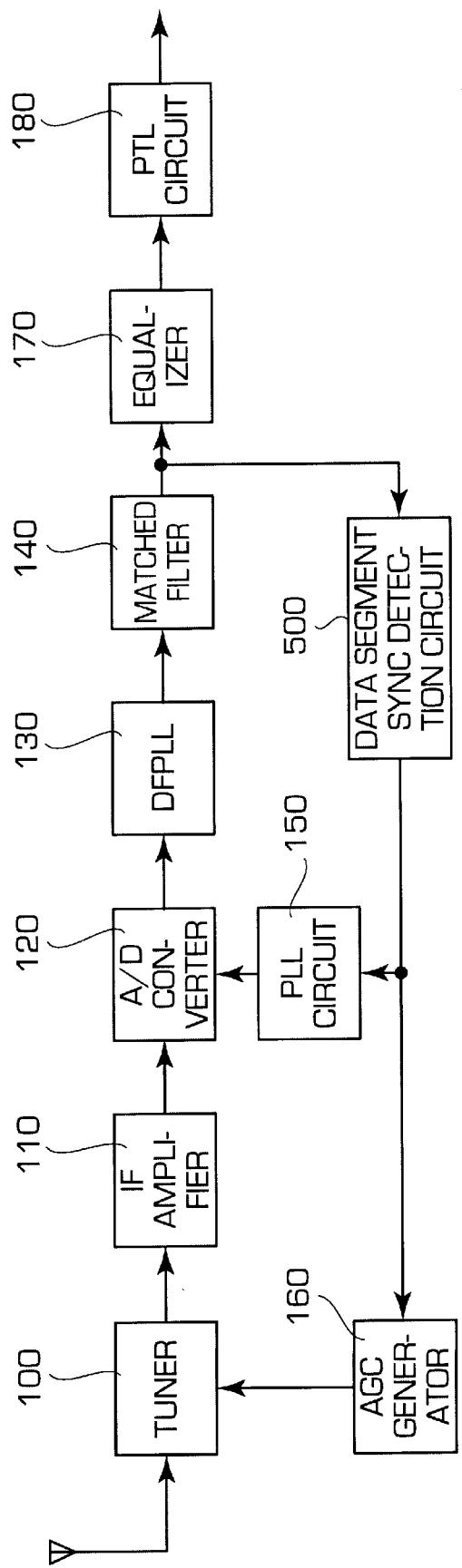
FIG. 2 is a block diagram of an HDTV system to which the present invention is applied.

In FIG. 2, which is a block diagram illustrating an HDTV system to which the present invention is applied, a tuner 100 converts received signals to an intermediate frequency (IF) signal, and an IF amplifier 110 amplifies the IF signal. An analog-to-digital converter 120 converts the analog IF signal output from amplifier 110 into digital form.

A digital frequency and phase-locked loop (DFPLL) circuit 130 extracts a carrier using a pilot signal included in the data output from the analog-to-digital converter 120 and restores the baseband data by multiplying the reconstructed carrier by the output of the analog-to-digital converter 120.

A matched filter 140 adjusts the symbol rate (the symbol frequency) of the data output from DFPLL circuit 130. Namely, matched filter 140 adjusts into "fs" the symbol rate of the data output from the DFPLL circuit 130 which is "2fs."

A data segment sync detection circuit 500 calculates the correlation value of data output from matched filter 140 by a unit of four symbols and accumulates the obtained correlation value of data for each data segment. By utilizing the fact that the accumulated correlation value of the data is the maximum across the four sync symbols, a synchronization signal is generated wherever maximum accumulated correlation values are detected. The configuration and the operation of the data segment sync detection circuit 500 will be described in detail later.

A phase locked loop (PLL) circuit 150 recovers the symbol clock in response to the synchronization signal output from data segment sync detection circuit 500. The analog-to-digital converter 120 samples data synchronized with the recovered symbol clock.

An AGC generator 160 generates an AGC signal using the data segment sync pulse detected in data segment sync detection circuit 500 to provide the signal to the tuner 100. The gain of tuner 100 is controlled in response to the applied AGC signal.

Meanwhile, the output of matched filter 140 is also applied to a phase tracking loop (PTL) circuit 180 through an equalizer 170. The PTL circuit 180 removes the phase noise (i.e., error) which is not removed in the DFPLL 130. The output of the PTL circuit 180 is trellis-decoded, de-interleaved, and error-corrected in a channel decoder (not shown). Additionally, the error-corrected data is source-decoded in a source decoder (not shown) and the output is displayed on a display (not shown).

Figure 3:
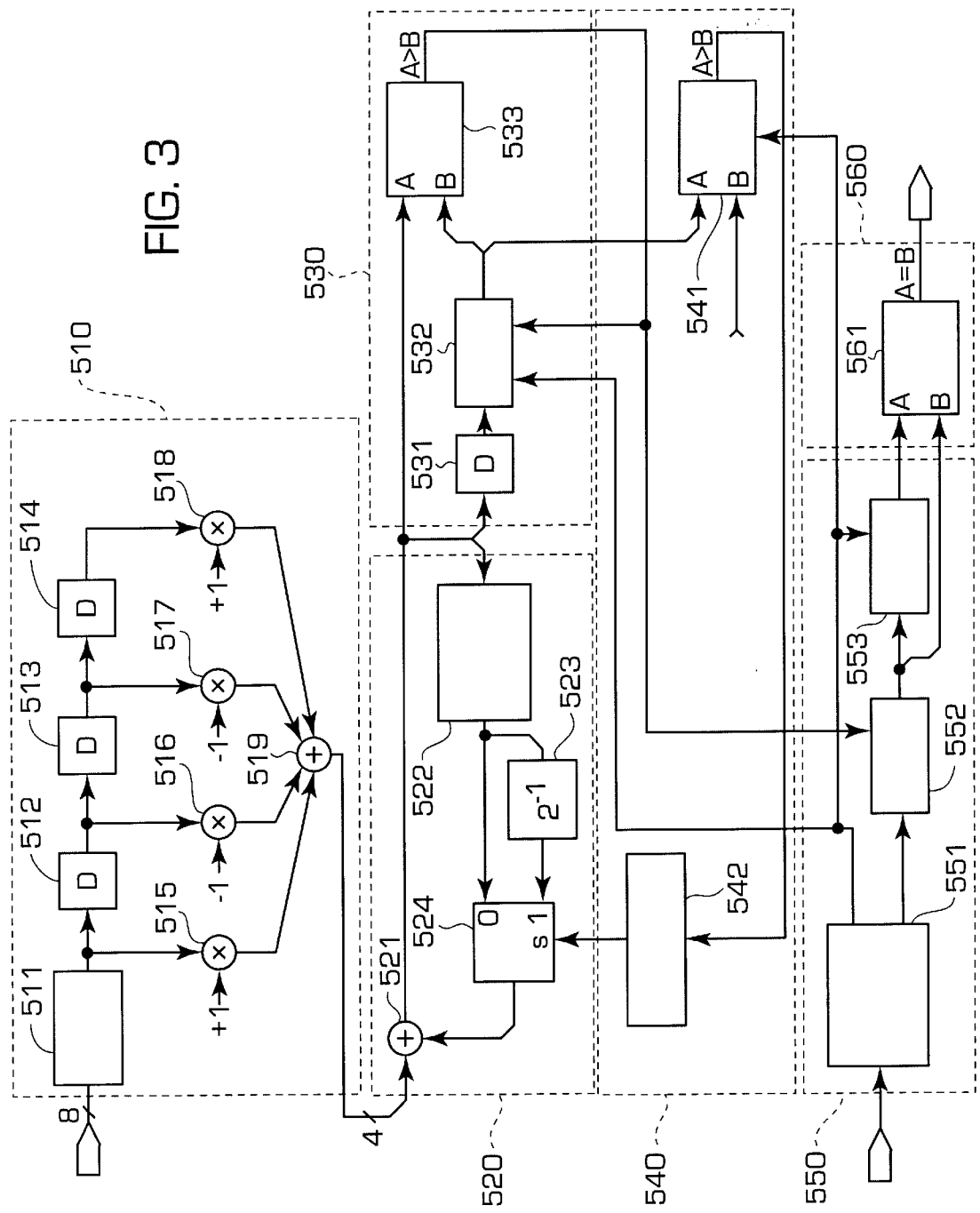
FIG. 3 is a detailed circuit diagram of the data segment sync detection circuit of FIG. 2 according to the present invention.

FIG. 3 is a detailed circuit diagram of the data segment sync detection circuit 500 of FIG. 2. In FIG. 3, the circuit of the present invention comprises a correlator 510 for detecting a correlation value of the most significant bit (i.e., the sign bit) of the digital segment by a unit of four symbols, a segment integrator 520 for accumulating the output of correlator 510 by segment units, a maximum value detector 530 for detecting the maximum accumulated correlation value in the data segment by comparing an output of segment integrator 520 with a one-symbol-delayed accumulated value, an overflow prevention circuit 540 for generating an overflow prevention signal by comparing an output from the maximum value detector 530 with a predetermined threshold value, a sync position detector 550 for detecting a symbol position in the segment data of the maximum accumulated correlation value which is generated in the data segment sync portion, and a sync generator 560 for generating a synchronization signal at the detected signal position.

Referring to FIG. 3, the correlator 510 comprises a sign bit selector 511 for selecting only the sign bit of data output from matched filter 140 of FIG. 2; three unit delays 512–514 connected in series with the output of the sign bit selector 511, for delaying the sign bit output from the sign bit selector 511 by one symbol; first to fourth multipliers 515–518 for multiplying the sign bit output from the sign bit selector 511 and the delays 512–514 by correlation vectors +1, −1, −1 and +1, respectively; and an adder 519 for summing the outputs of the first to fourth multipliers 515–518. The correlator 510 can be configured without the sign bit selector 511, but its use reduces the number of calculations and the size of the hardware, and facilitates integration of the circuit.

Segment integrator 520, having a feedback connection, comprises an adder 521 for receiving the output of the adder 519 as a first input, a segment delay 522 for delaying the output of the adder 521 by segment periods, a divider 523 for dividing the output of segment delay 522 by two, and a multiplexer (MUX) 524 which receives the outputs of segment delay 522 and divider 523, and outputs a selected output to a second input of the adder 521.

The maximum value detector 530 comprises a symbol delay 531 for delaying the output of the adder 521 for one symbol, a first register 532 (REG1) for latching the output of delay 531, and a first comparator (COMP1) 533 for comparing the outputs of adder 521 and first register 532 and for outputting a first comparison signal to part of the first register 532.

Overflow prevention circuit 540 comprises a second comparator (COMP2) 541 for outputting a second comparison signal based on the output of the first register 532 and a preset threshold value, and a signal generator 542 for generating an overflow prevention signal, having an enabling period of one data segment, in response to the second comparison signal to output the signal to the selection control port of the multiplexer 524.

Sync position detector 550 comprises a symbol counter 551 for counting 832 symbols of one segment according to the internally generated symbol clock, to generate a count value and a carry signal, and to output the carry signal to the reset port of the first register 532, and to the clock port of the second comparator 541. The sync position detector 500 further comprises a second register (REG2) 552 for storing the count value according to the first comparison signal input to its hold port, and a third register (REG3) 553 for storing the output of the second register 552 according to the carry signal which is applied to its hold port.

Sync generator 560 comprises a third comparator (COMP3) 561 for generating a sync timing signal based on the outputs of the second and third registers 552 and 553.

The operation of the circuit shown in FIG. 3 will be described referring to FIGS. 1, 2, 3 and 4A–4C.

Figure 1:
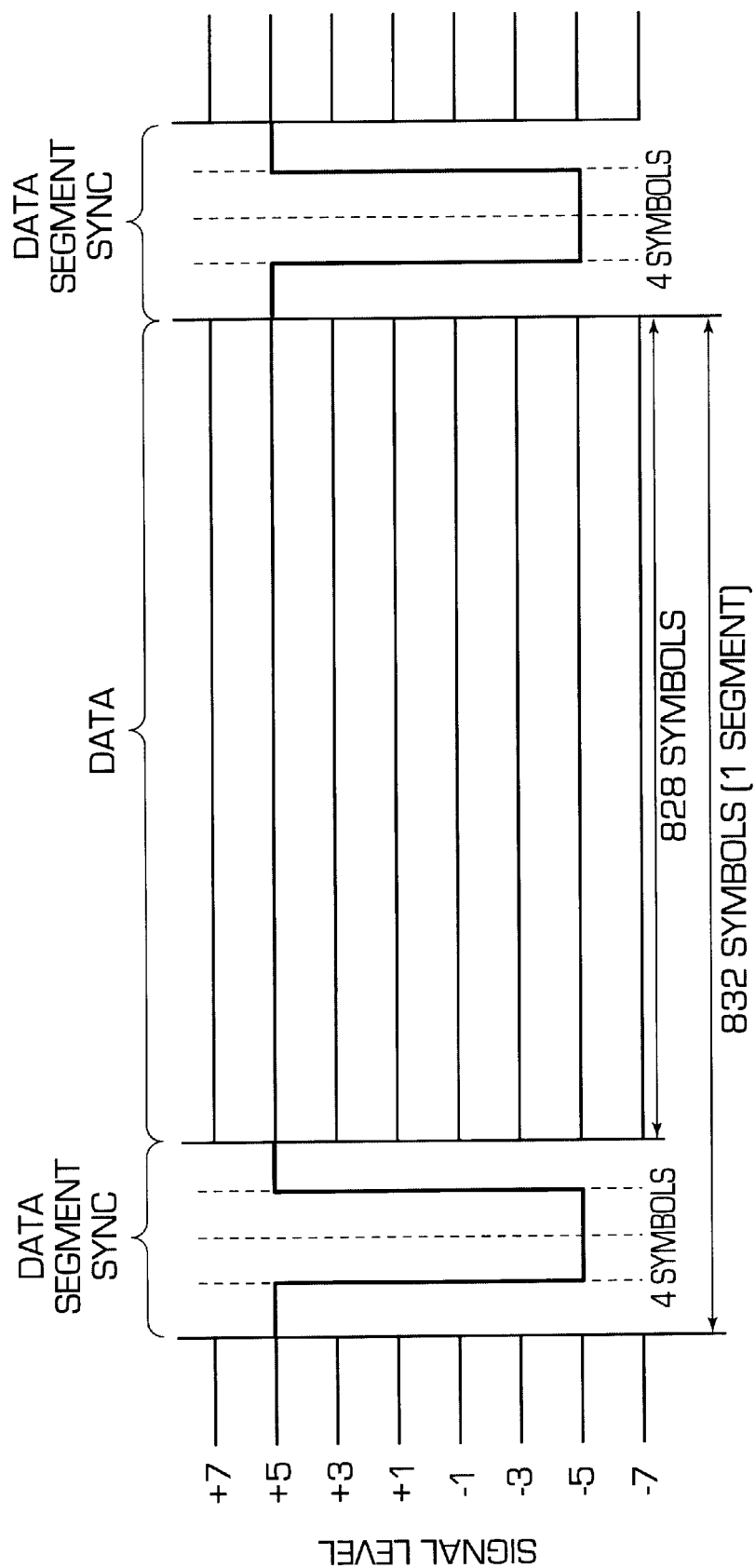
FIG. 1 shows the data segment structure used in a GA-HDTV system.

In FIG. 3, the digital segment signals of an HDTV system as shown in FIG. 1 are input via matched filter 140 of FIG. 2 to the sign bit selector 511. The sign bit selector 511 selects only the sign bit of the n-bit (here, n=8) data segment signal input and outputs the selected sign bit to the symbol delay 512 and to a first input port of multiplier 515.

The output of symbol delay 512 is input to a first input port of the multiplier 516. The output of the symbol delay 513, which delays the output of symbol delay 512 for one symbol, is input to a first input port of multiplier 517. The output of symbol delay 514, which delays the output of unit delay 513 for one symbol, is input to a first input port of multiplier 518.

The sign bit can have only two values, 1 and 0, in the 2's complement system. In the symbol correlator of the present invention, 0, which means positive, is represented by "1", and 1, which means negative is represented by "−1".

Each of the correlation vectors "+1", "−1", "−1" and "+1" is input to the second input ports of multipliers 515–518. Thus, multipliers 515–518 perform concurrent correlation operations with correlation vectors "+1", "−1", "−1" and "+1", respectively, by a unit of four symbols consisting of current symbol data, one-symbol-delayed data, two-symbol-delayed data and three-symbol-delayed data.

The first and fourth multipliers 515 and 518 output "1" when the sign bit input to the multipliers is "0", respectively, since the correlation vector "+1" is input to the second input ports. The second and third multipliers 516 and 517 also output "1" when the sign bit input to the multipliers is "1", respectively, since the correlation vector "−1" is input to the second input ports.

When a sign-bit 4-symbol input is "0110", an output of the adder 519 becomes the maximum value of "4" since each output of multipliers 515–518 becomes "1". Similarly, when the input is "1001", the output of adder 519 becomes the minimum value of "−4" since each output of the multipliers 515–518 becomes "−1". The output of adder 519 ranges between "+4" and "−4". Accordingly, in a data segment sync block having values of "+5, −5, −5 and +5", the output of adder 519 becomes the maximum value of "4" since the sign bit value becomes "0110".

In this manner, the present invention utilizes the fact that the correlation value accumulated in the data segment sync interval becomes the maximum value when the 4-symbol correlation value is accumulated by the unit of one data segment.

Meanwhile, adder 521 of segment integrator 520, adds the outputs of multiplexer 524 and adder 519. The output of adder 521 is simultaneously input to the segment delay 522, the unit delay 531 and the A input of the first comparator 533 of the maximum value detector 530.

The segment delay 522 delays the output of the adder 521 by a unit of one data segment, and then outputs the delayed result to the first input port (0) of the multiplexer 524 and to the divider 523. Divider 523 divides the output of the segment delay 522 by 2 and outputs the divided result to the second input port (1) of multiplexer 524. Thus, the first comparator 533 compares the two inputs, the direct input from the adder 521 and the one-symbol-delayed output of the adder 521.

First register 532 outputs the one-symbol-delayed output of adder 521 from unit delay 531, to the B input of the first comparator 533.

The first comparator 533 generates the first comparison signal when the output of adder 521 input to its A port is greater than that of first register 532 input to its B port. The first comparison signal is output as the hold signals for the first and second registers 532 and 552.

Since the value stored in first register 532 is updated by the first comparison signal, the maximum value among the accumulated correlation values is stored. The first register 532 receives, as a reset signal the carry signal output from symbol counter 551, and is initialized by one data segment period, so that the maximum accumulated correlation value is stored in every data segment.

The maximum accumulated correlation value stored in first register 532 is input to the A port of second comparator 541 of overflow prevention circuit 540 and a predetermined threshold is input to the B port thereof. The input maximum accumulated correlation value is compared with the input threshold, and synchronized with the carry signal from the symbol counter 551. When the maximum accumulated correlation value is greater than the threshold, the second comparison signal is output to the signal generator 542.

Signal generator 542 holds the second comparison signal by a unit of a segment period, and generates the overflow prevention signal which is output to the selection control port of the multiplexer 524.

Multiplexer 524 selects the output of divider 523, which is input to its second input port during the enabled period of the overflow prevention signal, and the output of the segment delay 522 which is input to its first input port otherwise, and feeds the selected output back to the second input of adder 521. The output of divider 523 is a signal obtained by dividing the output of segment delay 522 by 2. When the maximum accumulated correlation value is greater than the threshold, the maximum accumulated correlation value divided by 2 is fed back to the adder 521 at points P1–P4 shown in FIG. 4A. Accordingly, overflow can be prevented even though continuous accumulating operations are made.

On the other hand, symbol counter 551 of the sync position detector 550 repeatedly counts the number of symbols for every data segment according to the symbol clock to output a count value and a carry signal.

The count value from the symbol counter 551 is stored in the second register 552. Since the stored count value is updated by the first comparison signal, a count value corresponding to the position of the maximum accumulated correlation value is stored.

The output from the second register 552 is input to the third register 553 to be stored and is simultaneously input to the B input of the third comparator 561 (COMP3) of sync generator 560. The value stored in the third register 553 is updated by the carry signal output from the symbol counter 551, whereupon the stored value is input to the A port of the third comparator 561. That is, a count value, corresponding to the position where the maximum accumulated correlation value occurs in the relevant data segment, is always stored in the third register 553 according to the carry signal.

The third comparator 561 in the sync generator 560 compares the output from the second register 552 with that of the third register 553 and generates a sync signal when the two values are the same.

The signal output from the third comparator 561 can be used as a synchronization signal of the segment, since data segment sync exists where the maximum accumulated correlation value occurs and the value output from the third register 553 is a count value corresponding to the position of the maximum accumulated correlation value in every data segment.

Figure 4:
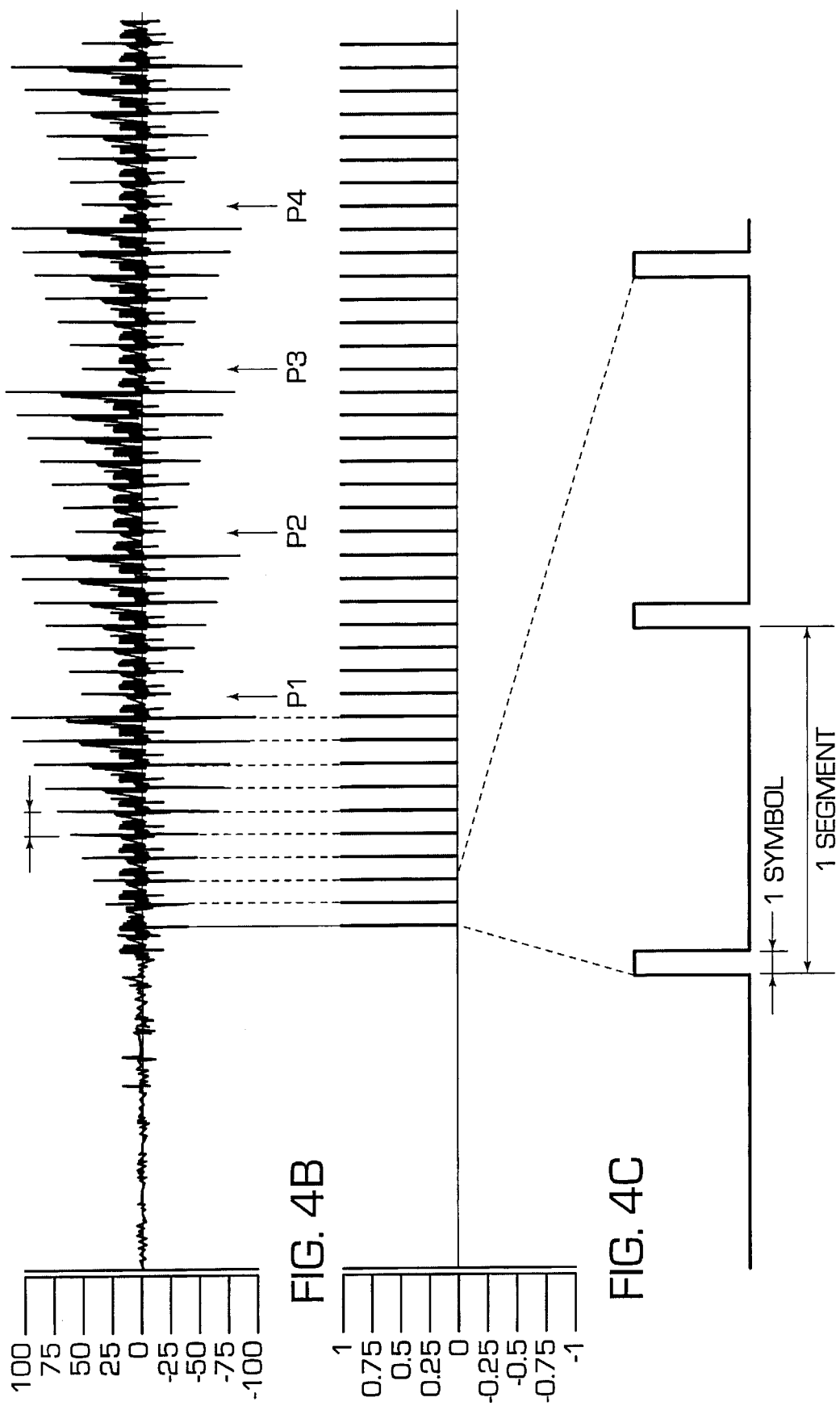
FIG. 4A shows an output waveform of the segment integrator shown in FIG. 3.
FIG. 4B shows the sync timing signal which is generated in the sync generator shown in FIG. 3.
FIG. 4C is an enlarged view of the sync timing signal shown in FIG. 4B.

FIG. 4A shows an output waveform from adder 521, and FIG. 4B shows a sequence of the synchronization signals which are generated at the position where the maximum accumulated correlation value occurs in each segment shown in FIG. 4A. FIG. 4C is an enlarged view of a portion of the synchronization signal sequence shown in FIG. 4A, where one symbol of "high" pulse occurs at a period of one data segment. This synchronization signal indicates only synchronization timing information, unlike an actual data segment sync signal of four symbols.

However, the four multipliers used in the correlator 510 shown in FIG. 3 are large and complicated in hardware and thus increase the overall production cost.

Figure 5:
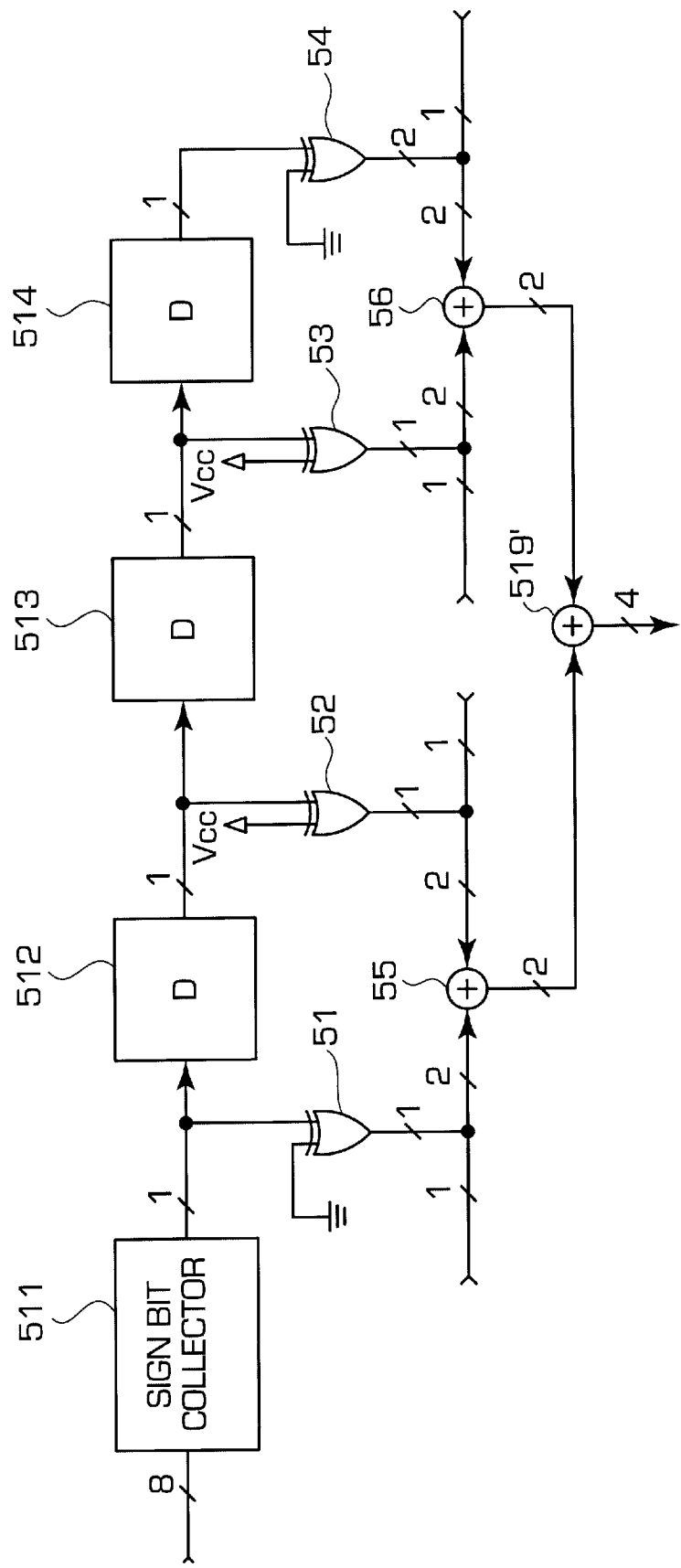
FIG. 5 is a circuit diagram of the correlator shown in FIG. 3 according to another embodiment of the present invention.

FIG. 5 shows a circuit diagram according to another embodiment of the symbol correlator 510, in which the hardware can be simplified by using exclusive OR gates instead of the multipliers. The operation of the symbol correlator shown in FIG. 5 will be described.

Sign bit selector 511 selects only the sign bit of a received data segment and outputs the selected bit to the series of symbol delays 512–514 and to a first input of an exclusive-OR (XOR) gate 51. The output of delay 512 is input to a first input of the XOR gate 52. The output of delay 513, which delays the output of unit delay 512 for one symbol period, is input to a first input of the XOR gate 53, and the output of delay 514, which delays the output of delay 513 for one symbol, is input to a first input of the XOR gate 54.

The sign bit has a value of "1" or "0" which are negative and positive values, respectively, according to a system of 2's complement. Correlation vectors of "0" (ground), "1" (Vcc), "1" and "0" are input to the second inputs of the XOR gates 51–54, respectively. Thus, XOR gates 51–54 perform correlation operations with their respective correlation vectors, by a unit of four symbols including the current symbol data, one-symbol-delayed data, the two-symbol-delayed data, and the three-symbol-delayed data.

Since the second inputs of the first and fourth XOR gates 51 and 54 are tied to correlation vectors of "0", a logic "0" output is produced only when the sign bit is "0". Similarly, since the second inputs of the third XOR gates 52 and 53 are tied to correlation vectors of "1", a logic "0" output is produced only when the sign bit is "1".

A low 1 bit having a value of "1" is expanded to each output of the XOR gates 51–54. Thus, if any of the XOR gates 51–54 output a "0", then the output of the corresponding XOR gate will becomes "01" in a 2's complement expression and "1" in a decimal expression. Similarly, if any of the XOR gates 51–54 output a "1", then the output of the corresponding XOR gate is "11" in a 2's complement expression and "−1" in a decimal expression. The outputs from the XOR gates 51 and 52, of which lower bits are expanded as above, are summed at an adder 55 and those from XOR gates 53 and 54 are summed at an adder 56. The outputs of the adders 55 and 56 are summed at a final adder 519'.

Consequently, when the 4-symbol of the sign bit output from sign bit selector 511 is "0110", all the outputs of four XOR gates 51–54 become "0" and the results of the lower-bit expansion become "01", so that an output value of adder 519' becomes the maximum value of 4. When the 4-symbol of the signal bit output from sign bit selector 511 is "1001", the outputs of the four XOR gates 51–54 become "1" and the results of the lower-bit expansion become "11", so that an output value of adder 519' becomes the minimum value of −4. In the other cases, the output of adder 519' ranges somewhere between +4 and −4. Accordingly, in a data segment sync pulse whose four symbols have the sequential values of +5, −5, −5 and +5, the output of adder 519' becomes the maximum value of +4 since the sign bits of the 4-symbol data segment sync signal are "0110".

As described above, the data segment sync detection circuit of the present invention can precisely detect data segment synchronization, since a synchronization signal is generated by detecting the maximum value among the accumulated correlation values in each data segment, even though the position of the data segment sync pulse may fluctuate due to a carrier frequency offset, a symbol clock offset, noise, ghost signal or a symbol phase error in the received signal and so on.

Also, the circuit enables a simplified hardware structure by using only the sign bit of the data segment signal when embodying the correlator, and facilitates integration of circuits by reducing the amount of calculation while showing the same result as that of a computer-simulated floating point calculation. Further, the present invention enables a practical hardware embodiment by preventing a hardware overflow condition according to the increase of an accumulated value, since the segment integrator includes a feedback loop to keep the accumulated summation value from going over a predetermined threshold.

What is claimed is:

1. A circuit for detecting a data segment sync signal in each data segment of an incoming signal, said data segment comprising a plurality of symbols, said circuit comprising:

correlation value detecting means for detecting a correlation value from a predetermined number of symbols of a received data segment;

accumulating means for accumulating detected correlation values for said received data segment, and for dividing an accumulated correlation value by a predetermined value;

maximum value detecting means for detecting a maximum accumulated correlation value in said received data segment from an output of said accumulating means;

overflow generating means for generating a prevention signal by comparing the maximum accumulated correlation value with a threshold value;

sync position detecting means for detecting a position within said received data segment of said maximum accumulated correlation value; and sync generating means for generating a synchronization signal at the position corresponding to the maximum accumulated correlation value.

2. The circuit for detecting a data segment sync signal according to claim 1, wherein said correlation value detecting means comprises:

three unit delays, being connected in series, for delaying the received data segment by a unit of one symbol period, respectively;

a first multiplier for multiplying the received data segment by a first correlation vector having a first sign;

a second multiplier for multiplying an output of a first unit delay by a second correlation vector having a second sign different from said first correlation vector;

a third multiplier for multiplying an output of a second unit delay by a third correlation vector having said second sign;

a fourth multiplier for multiplying an output of a third unit delay by a fourth correlation vector having said first sign; and a summing circuit for summing outputs of said first, second, third and fourth multipliers.

3. The circuit for detecting a data segment sync signal according to claim 2, said correlation value detecting means further comprising a sign bit selector for selecting the most significant bit of each of said predetermined number of symbols of said received data segment to output to said three unit delays.

4. The circuit for detecting a data segment sync signal according to claim 3, wherein said accumulating means comprises:

an adder for adding an output value of said correlation value detecting means to a feedback value;

a segment delay for delaying an output value of said adder by one segment period;

a divider for dividing an output value of said segment delay by a predetermined value; and a selector for selecting one of the output of said divider and the output of said segment delay in response to the overflow prevention signal to output a selected output as the feedback value to said adder.

5. The circuit for detecting a data segment sync signal according to claim 3, wherein said maximum value detecting means comprises:

a symbol delay for delaying an output value of said accumulating means by a unit of a symbol;

a first register for storing an output value of said symbol delay; and a first comparator for generating a first comparison signal by comparing said output value of said accumulating means with an output of said first register to update the output value stored in said first register according to the first comparison signal.

6. The circuit for detecting a data segment sync signal according to claim 3, wherein said overflow preventing means comprises:

a second comparator for comparing the maximum accumulated correlation value of the received data segment output from said maximum value detecting means with a threshold value, and for outputting a second comparison signal when the maximum accumulated correlation value is at least equal to the predetermined threshold; and a signal generator for generating the overflow prevention signal which enables a data segment period in response to the second comparison signal.

7. The circuit for detecting a data segment sync signal according to claim 3, wherein said sync position detecting means comprises:

a counter for counting the number of symbols in the received data segment according to a symbol clock and for outputting a count value and a carry signal;

a second register for storing the count value according to said first comparison signal; and a third register for storing an output value of said second register according to the carry signal output from said counter.

8. The circuit for detecting a data segment sync signal according to claim 7, wherein said sync generating means comprises a third comparator for comparing an output value of said second register with an output value of said third register, and for generating the synchronization signal when the output values are congruous.

9. The circuit for detecting a data segment sync signal according to claim 1, wherein said correlation value detecting means comprises:

three unit delays, being connected in series, for delaying the received data segment by a unit of one symbol period, respectively;

a first XOR element for exclusive-OR-operating the received data segment and a first correlation vector having a first sign;

a second XOR element for exclusive-OR-operating an output of a first unit delay and a second correlation vector having a second sign different from said first correlation vector;

a third XOR element for exclusive-OR-operating an output of a second unit delay and a third correlation vector having said second sign;

a fourth XOR element for exclusive-OR-operating an output of a third unit delay and a fourth correlation vector having said first sign; and a summing circuit for summing outputs of said first, second, third and fourth XOR elements.

10. The circuit for detecting a data segment sync signal according to claim 9, wherein said correlation value detecting means further comprises a sign bit selector for selecting the most significant bit of each of said predetermined number of symbols of said received data segment signal to output to said three unit delays.

11. The circuit for detecting a data segment sync signal according to claim 10, wherein said accumulating means comprises:

an adder for adding an output value of said correlation value detecting means to a feedback value;

a segment delay for delaying an output of said adder by one segment period;

a divider for dividing an output value of said segment delay by a predetermined value; and a selector for selecting one of the output of said divider and the output of said segment delay in response to the overflow prevention signal to output a selected output as the feedback value to said adder.

12. The circuit for detecting a data segment sync signal according to claim 10, wherein said maximum value detecting means comprises:

a symbol delay for delaying the output value of said accumulating means by a unit of a symbol;

a first register for storing an output value of said symbol delay; and a first comparator for generating a first comparison signal by comparing said output value of said accumulating means with an output of said first register to update the output value stored in said first register according to the first comparison signal.

13. The circuit for detecting a data segment sync signal according to claim 10, wherein said overflow preventing means comprises:

a second comparator for comparing the maximum accumulated correlation value of the data segment output from said maximum value detecting means with a threshold value, and for outputting a second comparison signal when the maximum accumulated correlation value is at least equal to the predetermined threshold; and a signal generator for generating the overflow prevention signal which enables a data segment period in response to the second comparison signal.

14. The circuit for detecting a data segment sync signal according to claim 10, wherein said sync position detecting means comprises:

a counter for counting the number of symbols in the received data segment according to a symbol clock and for outputting a count value and a carry signal;

a second register for storing the count value according to said first comparison signal; and a third register for storing an output value of said second register according to the carry signal output from said counter.

15. The circuit for detecting a data segment sync signal according to claim 14, wherein said sync generating means comprises a third comparator for comparing an output value of said second register with an output value of said third register, and for generating the synchronization signal when the compared output values are congruous.

16. A circuit for detecting a data segment sync of a HDTV signal in which a single data segment is composed of a data segment sync of four symbols and data of 828 symbols, and wherein said data segment sync of four symbols is transmitted in first and second signal levels, said circuit comprising:

a sign bit selector for selecting the most significant bit of each of said four symbols in a received data segment;

three unit delays, being connected in series, for delaying a sign bit of the received data segment signal by a unit of a symbol, respectively;

a first multiplier for multiplying the sign bit by a first correlation vector having a first sign;

a second multiplier for multiplying an output of a first unit delay by a second correlation vector having a second sign different from said first sign;

a third multiplier for multiplying an output of a second unit delay by a third correlation vector having said second sign;

a fourth multiplier for multiplying an output of a third unit delay by a fourth correlation vector having said first sign;

a summing circuit for summing outputs of said first, second, third, and fourth multipliers to output a correlation value;

accumulating and dividing means for accumulating correlation values for said received data segment and for dividing an accumulated value by a predetermined value;

means for detecting a maximum accumulated correlation value in said received data segment from an output of said accumulating and driving means;

means for generating the overflow prevention signal by comparing the maximum accumulated correlation value with a threshold value;

means for detecting a symbol position within said received data segment having the maximum accumulated correlation value; and means for generating a synchronization signal at the position corresponding to the maximum accumulated correlation value.

17. A circuit for detecting a data segment sync of a HDTV signal, in which a single data segment is composed of a data segment sync of four symbols and data of 828 symbols and said data segment sync of four symbols is transmitted in first and second signal levels, said circuit comprising:

a sign bit selector for selecting the most significant bit of said four symbols of a received data segment;

three unit delays, being connected in series, for delaying a sign bit of the received data segment by a unit of a symbol, respectively;

a first exclusive OR element for exclusive-OR-operating the received data segment and a first correlation vector having a first sign;

a second XOR element for exclusive-OR-operating an output of a first unit delay and a second correlation vector having a second sign different from said first sign;

a third XOR element for exclusive-OR-operating an output of a second unit delay and a third correlation vector having said second sign;

a fourth XOR element for exclusive-OR-operating an output of a third unit delay and a fourth correlation vector having said first sign;

a summing circuit for summing outputs of said first, second, third and fourth XOR elements to output a correlation value;

accumulating and dividing means for accumulating the correlation values for said received data segment and for dividing an accumulated value by a predetermined value;

means for detecting a maximum accumulated correlation value in the received data segment from an output of said accumulating and dividing means;

means for generating an overflow prevention signal by comparing the maximum accumulated correlation value with a threshold value;

means for detecting a symbol position within said received data segment having the maximum accumulated correlation value; and means for generating a synchronization signal at the symbol position corresponding to the maximum accumulated correlation value.

18. A method for detecting a data segment sync of each data segment of an input signal, wherein each said data segment comprises of a plurality of symbols, said method comprising the steps of:

detecting a correlation value from a predetermined number of symbols of a received data segment;

accumulating correlation values for said received data segment;

dividing an accumulated correlation value by a predetermined value;

detecting a maximum accumulated correlation value in the received data segment among the accumulated correlation values;

generating an overflow prevention signal by comparing the maximum accumulated correlation value with a threshold value;

detecting a symbol position within said received data segment having the maximum accumulated correlation value; and generating a synchronization signal at the symbol position corresponding to the maximum accumulated correlation value.

19. The method according to claim 18, wherein said step of detecting a correlation value comprises the steps of:

delaying the received data segment in three unit delays by a unit of one symbol period, respectively;

multiplying the received data segment by a first correlation vector having a first sign;

multiplying an output of a first unit delay by a second correlation vector having a second sign different from said first correlation vector;

multiplying an output of a second unit delay by a third correlation vector having said second sign;

multiplying an output of a third unit delay by a fourth correlation vector having said first sign; and summing outputs of said first, second, third and fourth multipliers.

20. The method according to claim 19, wherein said step of detecting a correlation value further comprises the step of:

selecting the most significant bit of each of said predetermined number of symbols of said received data segment to output to said three unit delays.

21. The method according to claim 20, wherein said step of accumulating correlation values comprises the steps of:

adding an output value of a correlation value detecting means to a feedback value in an adder;

for delaying an output value of said adder by one segment period in a segment delay;

dividing an output value of said segment delay by a predetermined value in a divider; and selecting one of the output of said divider and the output of said segment delay in response to the overflow prevention signal to output a selected output as the feedback value to said adder.

22. The method according to claim 20, wherein said step of detecting a maximum accumulation correlation value comprises the steps of:

delaying with a symbol delay an output value of an accumulating means by a unit of a symbol;

storing an output value of said symbol delay in a first register; and generating a first comparison signal by comparing said output value of said accumulating means with an output of said first register to update the output value stored in said first register according to the first comparison signal.

23. The method according to claim 20, wherein said step of generating said overflow prevention signal comprises the steps of:

comparing the maximum accumulated correlation value of the received data segment with a threshold value;

outputting a second comparison signal when the maximum accumulated correlation value is at least equal to the predetermined threshold; and generating the overflow prevention signal which enables a data segment period in response to the second comparison signal.

24. The method according to claim 20, wherein said step of detecting said sync position within said received data segment comprises the steps of:

counting the number of symbols in the received data segment according to a symbol clock;

outputting a count value and a carry signal;

storing the count value according to said first comparison signal in a second register; and storing an output value of said second register according to the carry signal in a third register.

25. The method according to claim 24, wherein said step of generating said synchronization signal comprises the steps of:

comparing an output value of said second register with an output value of said third register; and generating the synchronization signal when the output values are congruous.

26. The method according to claim 18, wherein said step of detecting a correlation value comprises the steps of:

delaying the received data segment in three unit delays by a unit of one symbol period, respectively;

exclusive-OR-operating the received data segment and a first correlation vector having a first sign;

exclusive-OR-operating an output of a first unit delay and a second correlation vector having a second sign different from said first sign;

exclusive-OR-operating an output of a second unit delay and a third correlation vector having said second sign;

exclusive-OR-operating an output of a third unit delay and a fourth correlation vector having said first sign; and summing outputs of said first, second, third and fourth XOR elements.

27. The method according to claim 26, wherein said step of detecting a correlation value further comprises the step of:

selecting the most significant bit of each of said predetermined number of symbols of said received data segment signal to output to said three unit delays.

28. The method according to claim 27, wherein said step of accumulating correlation values comprises the steps of:

adding an output value of a correlation value detecting means to a feedback value in an adder;

delaying an output of said adder by one segment period in a segment delay;

dividing an output value of said segment delay by a predetermined value in a divider; and selecting one of the output of said divider and the output of said segment delay in response to the overflow prevention signal to output a selected output as the feedback value to said adder.

29. The method according to claim 27, wherein said step of detecting a maximum accumulation correlation value comprises the steps of:

delaying in a symbol delay the output value of an accumulating means by a unit of a symbol;

storing an output value of said symbol delay in a first register; and generating a first comparison signal by comparing said output value of said accumulating means with an output of said first register to update the output value stored in said first register according to the first comparison signal.

30. The method according to claim 27, wherein said step of generating said overflow prevention signal comprises the steps of:

comparing the maximum accumulated correlation value of the data segment with a threshold value;

outputting a second comparison signal when the maximum accumulated correlation value is at least equal to the predetermined threshold; and generating the overflow prevention signal which enables a data segment period in response to the second comparison signal.

31. The method according to claim 27, wherein said step of detecting said sync position comprises the steps of:

counting the number of symbols in the received data segment according to a symbol clock;

outputting a count value and a carry signal;

storing the count value according to said first comparison signal in a second register; and storing an output value of said second register according to the carry signal in a third register.

32. The circuit for detecting a data segment sync signal according to claim 31, wherein said step of generating said synchronization signal comprises the steps of:

comparing an output value of said second register with an output value of said third register; and generating the synchronization signal when the compared output values are congruous.

33. A method of detecting a data segment sync of a HDTV signal in which a single data segment is composed of a data segment sync of four symbols and data of 828 symbols, and wherein said data segment sync of four symbols is transmitted in first and second signal levels, said method comprising the steps of:

selecting the most significant bit of each of said four symbols in a received data segment;

delaying a sign bit of each of the four symbols of the received data segment signal by a unit of a symbol, respectively;

multiplying the sign bit by a first correlation vector having a first sign;

multiplying an output of a first unit delay by a second correlation vector having a second sign different from said first sign;

multiplying an output of a second unit delay by said second correlation vector;

multiplying an output of a third unit delay by said first correlation vector;

summing results of said multiplying steps to output a correlation value;

accumulating correlation values for each received data segment;

dividing an accumulated value by a predetermined value;

detecting a maximum accumulated correlation value in said received data segment;

generating an overflow prevention signal by comparing the maximum accumulated correlation value with a threshold value;

detecting a symbol position within said received data segment having the maximum accumulated correlation value; and generating a synchronization signal at the position corresponding to the maximum accumulated correlation value.

34. A method of detecting a data segment sync of a HDTV signal, in which a single data segment is composed of a data segment sync of four symbols and data of 828 symbols and said data segment sync of four symbols is transmitted in first and second signal levels, said method comprising the steps of:

selecting the most significant bit of said four symbols of a received data segment;

delaying selected bits of the received data segment by a unit of a symbol, respectively;

exclusive-OR-operating the received data segment and a first correlation vector having a first sign;

exclusive-OR-operating an output of a first unit delay and a second correlation vector having a second sign different from said first sign;

exclusive-OR-operating an output of a second unit delay and a third correlation vector having said second sign;

exclusive-OR-operating an output of a third unit delay and a fourth correlation vector having said first sign;

summing output results of said exclusive-OR-operations to output a correlation value;

accumulating the correlation values for said received data segment;

dividing an accumulated value by a predetermined value;

detecting a maximum accumulated correlation value in the received data segment;

generating an overflow prevention signal by comparing the maximum accumulated correlation value with a threshold value;

detecting a symbol position within said received data segment having the maximum accumulated correlation value; and generating a synchronization signal at the symbol position corresponding to the maximum accumulated correlation value.

* * * * *